(12) United States Patent
Pawlak et al.

(10) Patent No.: US 11,474,383 B2
(45) Date of Patent: Oct. 18, 2022

(54) OPTICAL POWER MODULATORS BASED ON TOTAL INTERNAL REFLECTION

(71) Applicant: GLOBALFOUNDRIES U.S. Inc., Santa Clara, CA (US)

(72) Inventors: Bartlomiej J. Pawlak, Leuven (BE); Yusheng Bian, Ballston Lake, NY (US)

(73) Assignee: GlobalFoundries U.S. Inc., Santa Clara, CA (US)

(*) Notice: Subject to any disclaimer, the term of this patent is extended or adjusted under 35 U.S.C. 154(b) by 39 days.

(21) Appl. No.: 17/092,793

(22) Filed: Nov. 9, 2020

(65) Prior Publication Data
US 2022/0146863 A1 May 12, 2022

(51) Int. Cl.
*G02F 1/035* (2006.01)
*G02F 1/01* (2006.01)

(52) U.S. Cl.
CPC ............ *G02F 1/011* (2013.01); *G02F 1/0102* (2013.01); *G02F 1/0147* (2013.01)

(58) Field of Classification Search
CPC ....... G02F 1/011; G02F 1/0102; G02F 1/0147
USPC ........................ 385/1–9, 14, 41, 42, 129–132
See application file for complete search history.

(56) References Cited

U.S. PATENT DOCUMENTS 4,971,426 A 11/1990 Schildkraut et al.
6,282,005 B1* 8/2001 Thompson ............. H04B 10/58
359/254
2003/0223668 A1* 12/2003 Breukelaar ............. G02F 1/035
385/2
2010/0330727 A1* 12/2010 Hill .......................... G02F 1/025
257/E31.127
2016/0246016 A1* 8/2016 Mizrahi ................... G02B 6/26

OTHER PUBLICATIONS

Hyo-Hoon Park and Jong-Hun Kim, "Total-internal-reflection optical switch in silicon," 2016 Progress in Electromagnetic Research Symposium (PIERS), Shanghai, 2016, pp. 3378-3378.
Laurent Vivien, "Silicon photonics: Integrated modulators and detectors", Winter College on Optics: Fundamentals of Photonics—Theory, Devices and Applications, Feb. 10-21, 2014.
Reed et al. "Silicon optical modulators", materialstoday, vol. 8, Issue 1, Jan. 2005, pp. 40-50.
J. Witzens, "High-Speed Silicon Photonics Modulators," in Proceedings of the IEEE, vol. 106, No. 12, pp. 2158-2182, Dec. 2018.
(Continued)

*Primary Examiner* — Kaveh C Kianni
*Assistant Examiner* — Hung Q Lam
(74) *Attorney, Agent, or Firm* — Thompson Hine LLP; Anthony Canale

(57) ABSTRACT

Structures for an optical power modulator and methods of fabricating a structure for an optical power modulator. A waveguide core includes a longitudinal axis, a first section, and a second section spaced from the first section along the longitudinal axis. An active layer includes a portion positioned along the longitudinal axis between the first section and the second section of the waveguide core. The active layer contains a material configured to have a first state with a first refractive index in response to an applied stimulus and a second state with a second refractive index different from the first refractive index.

20 Claims, 5 Drawing Sheets

(56) References Cited

OTHER PUBLICATIONS

Sorger et al., "Ultra-compact silicon nanophotonic modulator with broadband response", Nanophotonics | vol. 1 Issue 1, Published online: May 23, 2012.
Shen, et al, "Fabrication of depletion type micro-ring modulator with high extinction ratio and high coupling quality factor" MATEC Web Conf. 139 00066 (2017).
Mashanovich et al., "Silicon photonic waveguides for different wavelength regions", Published May 12, 2008, 2008 IOP Publishing Ltd, Semiconductor Science and Technology, vol. 23, No. 6.
Jong-Hun Kim and Hyo-Hoon Park, "Total internal reflection optical switch using the reverse breakdown of a pn junction in silicon," Opt Lett. 40, 4859-4862 (2015).
Ziebell et al., "Ten Gbit/s ring resonator silicon modulator based on interdigitated PN junctions," Opt. Express 19, 14690-14695 (2011).
Amin et al., "Active material, optical mode and cavity impact on nanoscale electro-optic modulation performance", Nanophotonics, 7(2), 455-472 (2018).
Schlarb et al., "Refractive indices of lithium niobate as a function of wavelength and composition", Journal of Applied Physics 73, 3472 (1993).
Reed et al., "Silicon photonics: optical modulators", Proceedings vol. 7608, Quantum Sensing and Nanophotonic Devices VII, Jan. 22, 2010.

\* cited by examiner

OPTICAL POWER MODULATORS BASED ON TOTAL INTERNAL REFLECTION

BACKGROUND

The present invention relates to photonics chips and, more specifically, to structures for an optical power modulator and methods of fabricating a structure for an optical power modulator.

Photonics chips are used in many applications and systems including, but not limited to, data communication systems and data computation systems. A photonics chip integrates optical components, such as waveguides, optical switches, optical power splitters, and directional couplers, and electronic components, such as field-effect transistors, into a unified platform. Among other factors, layout area, cost, and operational overhead may be reduced by the integration of both types of components on the same chip.

An electro-optic modulator can be used as an optical switch to modulate the amplitude or phase of an optical signal under the control of an electrical signal. The modulation can be utilized to convert a continuous optical signal into an encoded data stream containing binary data. One type of optical switch is a Mach-Zehnder interferometer (MZI) modulator. A disadvantage of this type of switching is that MZI modulators exhibit a weak electro-optic effect. For that reason, MZI modulators must have a large form factor having lengthy dual arms. During operation, MZI modulators also tend to consume large amounts of power. Hence, MZI modulators may adversely impact both the layout area due to the large form factor and the operational overhead of a photonics chip due to power consumption.

Improved structures for an optical power modulator and methods of fabricating a structure for an optical power modulator are needed.

SUMMARY

In an embodiment of the invention, a structure includes a waveguide core having a longitudinal axis, a first section, and a second section spaced from the first section along the longitudinal axis. The structure further includes an active layer including a portion positioned along the longitudinal axis between the first section and the second section of the waveguide core. The active layer is comprised of a material configured to have a first state with a first refractive index in response to an applied stimulus and a second state with a second refractive index different from the first refractive index.

In an embodiment of the invention, a method includes forming a waveguide core including a longitudinal axis, a first section, and a second section spaced from the first section along the longitudinal axis. The method further includes forming an active layer including a portion positioned along the longitudinal axis between the first section and the second section of the waveguide core. The active layer is comprised of a material configured to have a first state with a first refractive index in response to an applied stimulus and a second state with a second refractive index different from the first refractive index.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
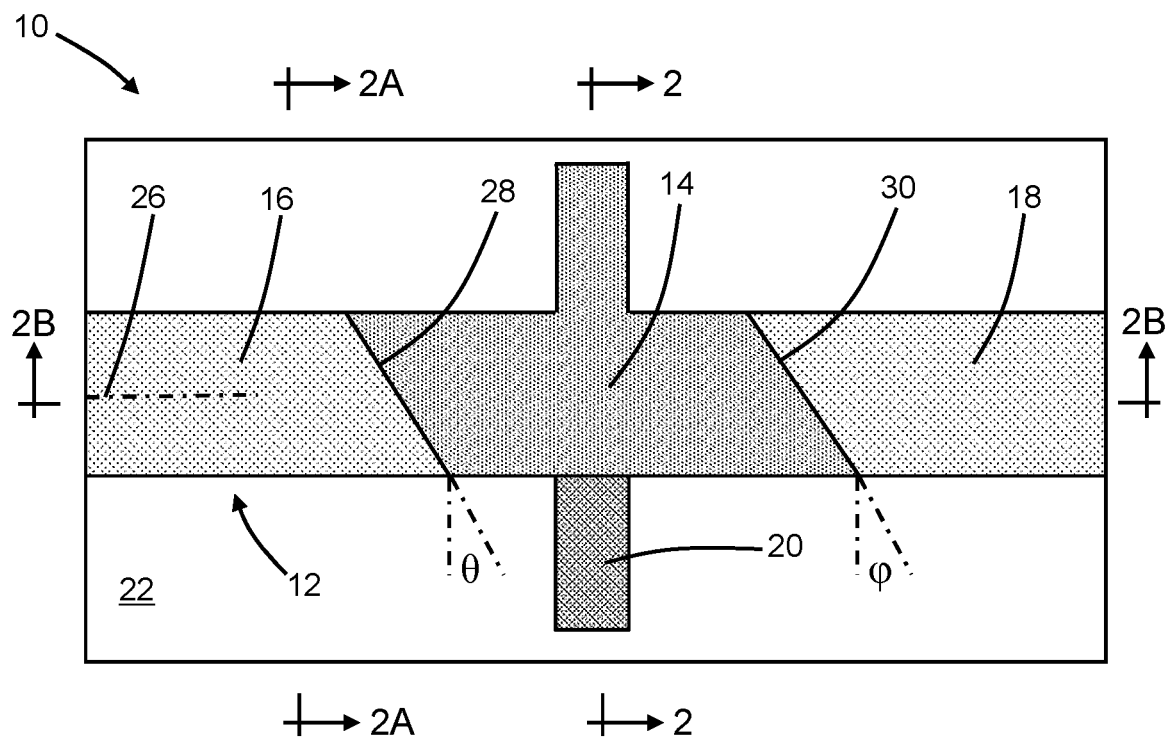
FIG. 1 is a top view of a structure at an initial fabrication stage of a processing method in accordance with embodiments of the invention.

With reference to FIGS. 1, 2, 2A, 2B and in accordance with embodiments of the invention, a structure 10 for an optical power modulator includes a waveguide core 12, an active layer 14 that is positioned between a section 16 of the waveguide core 12 and a section 18 of the waveguide core 12, and an electrode 20 positioned beneath the active layer 14. The waveguide core 12, active layer 14, and electrode 20 are arranged over and on a dielectric layer 22. In an embodiment, the electrode 20 may be positioned fully beneath the active layer 14 such that the active layer 14 is fully spaced from the dielectric layer 22 by the electrode 20. In an alternative embodiment, the electrode 20 may be positioned only beneath a portion of the active layer 14 such that only a portion of the active layer 14 is spaced from the dielectric layer 22 by the electrode 20.

The dielectric layer 22 may be comprised of a dielectric material, such as silicon dioxide, deposited over a buried oxide layer 23. The dielectric layer 22 may be located on and over a buried oxide layer 23 in a region of a silicon-on-insulator (SOI) substrate from which the device layer of the SOI substrate has been patterned and removed. The SOI substrate further includes a handle substrate 24, such as a silicon substrate, that provides mechanical support for the buried oxide layer.

The waveguide core 12 may be formed from a layer of a dielectric material, such as silicon nitride, that is deposited and patterned to shape by lithography and etching processes. The waveguide core 12 may be patterned by subsequent lithography and etching processes to remove a section of the waveguide core 12 and thereby form the sections 16, 18 that are separated from each other by a gap or space at the location of the removed section. The electrode 20 may be formed between the sections 16, 18 from a layer of a conductor, such as doped polysilicon or indium-tin oxide, that is deposited and patterned to shape by lithography and etching processes. The active layer 14 may be formed between the sections 16, 18 of the waveguide core 12 from a layer of an active material that is deposited on the electrode 20 and patterned to shape by lithography and etching processes. In an alternative embodiment, the waveguide core 12 may be comprised of a different material, such as single-crystal silicon or a III-V compound semiconductor material. In an alternative embodiment, the active layer 14 and the electrode 20 may be comprised of the same material.

The active layer 14 may be comprised of an active material having an index of refraction (i.e., refractive index) that can be tuned (i.e., can be varied) through the application of an applied stimulus, such as an applied bias voltage. In an embodiment, the active layer 14 may be comprised of an electro-optic material characterized by a refractive index that can be reversibly varied by the presence and absence of an applied bias voltage among discrete states each characterized by a different refractive index. In an embodiment, the refractive index of the active material may exhibit multiple discrete states (e.g., a binary pair including an "ON' state and an "OFF" state) in which the real parts and the imaginary parts are significantly different. For example, the refractive index of the active material may have a higher real part and a lower imaginary part in one state than in another state. In an embodiment, the refractive index of the active material may be characterized by a lower real part and a higher imaginary part when a bias voltage is applied than when the active material is unbiased.

In an embodiment, the active layer 14 may be comprised of indium-tin oxide for which the real part and imaginary parts of its refractive index may respectively be around 2 and zero in the absence of applied bias voltage and the real part and imaginary parts of its refractive index may respectively be around 1 and 0.3 with a bias voltage applied. In an alternative embodiment, the active layer 14 may be comprised of lithium niobite. In an alternative embodiment, the active layer 14 may be comprised of barium titanate.

The active layer 14 is laterally positioned along a longitudinal axis 26 of the waveguide core 12 between the section 16 of the waveguide core 12 and the section 18 of the waveguide core 12. The active layer 14 has an end surface 13 and the section 16 of the waveguide core 12 has an end surface 17 that adjoins the end surface 13 along an interface 28. The interface 28 may be inclined or angled at an acute angle, θ, relative to the longitudinal axis 26. In an embodiment, the end surface 13 of the active layer 14 and the end surface 17 of the section 16 of the waveguide core 12 may be in direct contact with each other at the interface 28. The angle of incidence at the interface 28 of the laser light arriving at the structure 10 propagating in the section 16 of the waveguide core 12 may be equal to the angle, θ.

The active layer 14 has an end surface 15 and the section 18 of the waveguide core 12 has an end surface 19 that adjoins the end surface 15 along an interface 30. In an embodiment, the interface 30 may be inclined or angled at an acute angle, φ, relative to the longitudinal axis 26. In an embodiment, the interfaces 28, 30 may be inclined at equal angles. In an embodiment, the end surface 15 of the active layer 14 and the end surface 19 of the section 18 of the waveguide core 12 may be joined in a non-angled manner such that the longitudinal axis 26 perpendicularly intersects the end surfaces 15, 19 at the interface 30. In an embodiment, the end surface of the active layer 14 and the end surface of the section 16 of the waveguide core 12 may be in direct contact with each other at the interface 28.

The structure 10 may operate based upon Snell's law that describes the relationship between the angle of incidence and the angle of refraction for light passing through an interface between two different media. For a given angle of incidence, the angle of refraction is proportional to the ratio of the real part of the refractive indices of the two different media in the formula for Snell's law. For an angle of incidence larger than a critical angle, light is totally reflected at the interface (i.e., total internal reflection). The critical angle is dependent upon the ratio of the real part of refractive indices of the two different media and will change with a variation in the real part of the refractive index of one or the other of the media.

In this instance, the transmittal of laser light past the interface 28 is contingent upon the ratio of the real part of the refractive indices of the materials of the waveguide core 12 and the active layer 14. The angle of incidence of the laser light relative to the interface 28 is fixed through the selection of the angle, θ. The angle, θ, is close in value to (e.g., slightly less than) the angle of incidence corresponding to the critical angle for total internal reflection at the interface 28. A change in the refractive index of the material of the active layer 14 induced by electric modulation through the bias voltage will swap or toggle the total internal reflection condition, which accordingly allows laser light to pass through the structure 10 or to be suppressed. In that regard, the change in the real part of the refractive index of the active material in the active layer 14 with applied bias voltage changes the critical angle such that the angle of incidence relative to the interface 28 is less than the critical angle when the active layer 14 is unbiased and the angle of incidence relative to the interface 28 is greater than the critical angle when a bias voltage is applied to the active layer 14. In the latter state, total internal reflection occurs and laser light is not transmitted to the section 18 of the waveguide core 12.

Figure 2:
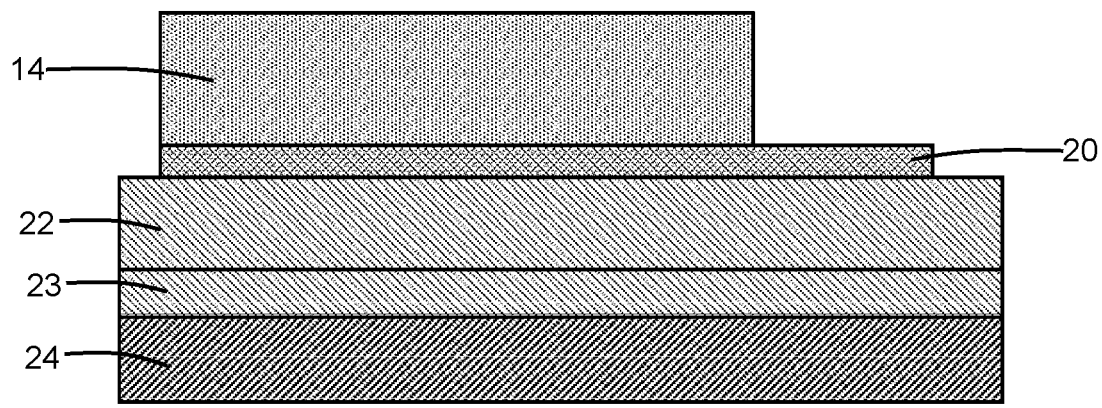
FIG. 2 is a cross-sectional view of the structure taken generally along line 2-2 in FIG. 1.
Figure 2A:
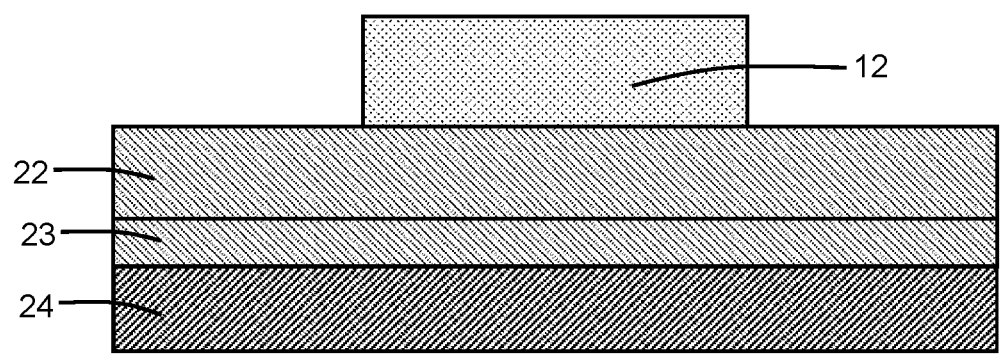
FIG. 2A is a cross-sectional view of the structure taken generally along line 2A-2A in FIG. 1.
Figure 2B:
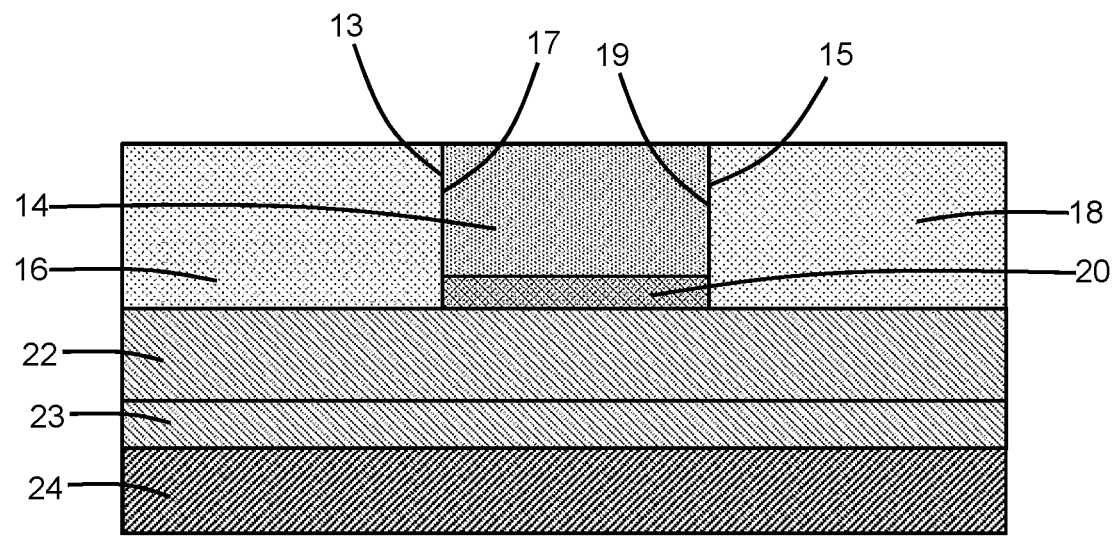
FIG. 2B is a cross-sectional view of the structure taken generally along line 2B-2B in FIG. 1.
Figure 3:
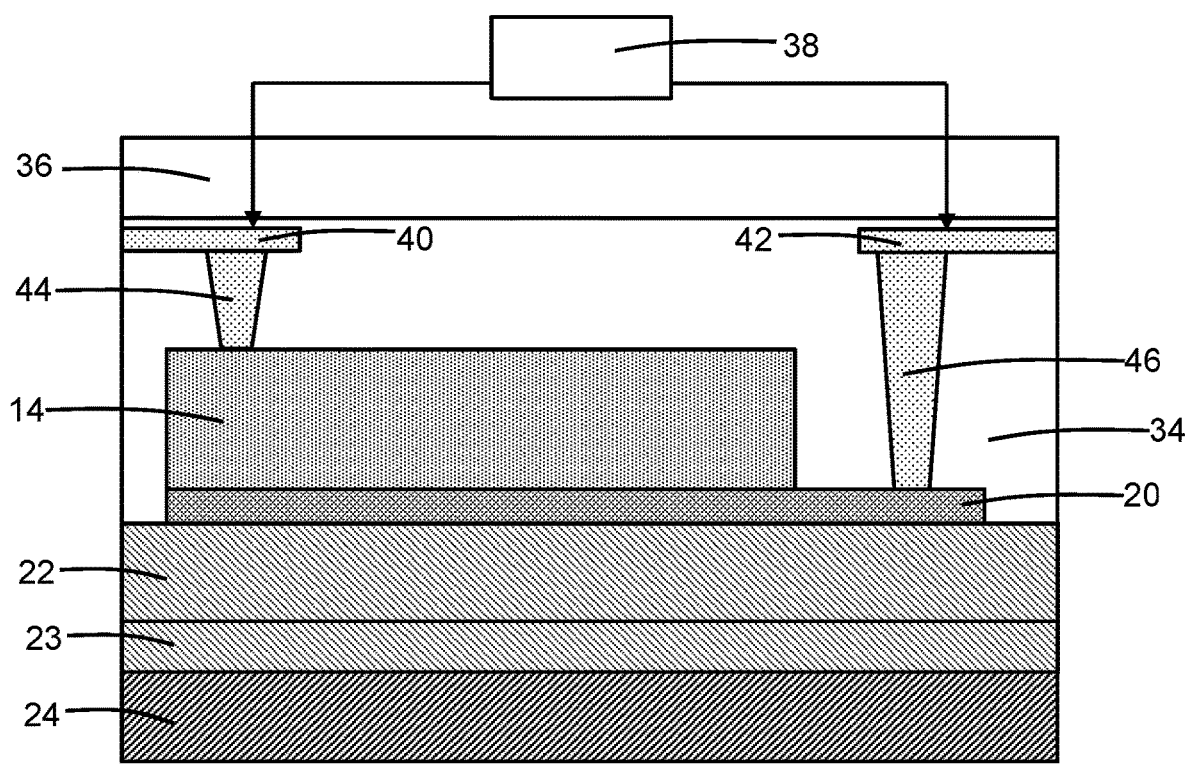
FIG. 3 is a cross-sectional view of the structure at a fabrication stage subsequent to FIG. 2.

With reference to FIG. 3 in which like reference numerals refer to like features in FIG. 2 and at a subsequent fabrication stage, a dielectric layer 34 comprised of a dielectric material, such as silicon dioxide, is deposited by chemical vapor deposition and planarized with, for example, chemical mechanical polishing to remove topography. The waveguide core 12 and active layer 14 are embedded or buried in the dielectric material of the dielectric layer 34.

A contact 44 is formed in the dielectric layer 34 that connects a portion of the active layer 14 with a wire 40, and a contact 46 is formed in the dielectric layer 34 that connects a portion of the electrode 20 not covered by the active layer 14 with a wire 42. The wires 40, 42 are coupled to a power supply 38 that is configured to provide and remove the bias voltage used to tune the refractive index of active material of the active layer 14. The contacts 44, 46 may be located in respective etched via openings in the dielectric layer 34. Through these connections, a switchable bias voltage may be applied to the active layer 14 and electrode 20 in order to generate the electric field that can produce the change in the refractive index of the active material contained in the active layer 14, and removed to reverse the refractive index change. The contacts 44, 46 and wires 40, 42 are positioned relative to the structure 10 so as to not interfere with its optical operation.

A back-end-of-line stack 36 may be formed by back-end-of-line processing over the dielectric layer 34. The back-end-of-line stack 36 may include one or more interlayer dielectric layers comprised of one or more dielectric materials, such as silicon dioxide and silicon nitride.

The structure 10, in any of its embodiments described herein, may be integrated into a photonics chip that includes electronic components and additional optical components. For example, the electronic components may include field-effect transistors that are fabricated using the device layer by CMOS processing.

In use, continuous laser light propagating in the section 16 of the waveguide core 12 may enter the structure 10. The structure 10 may be switched between 'ON' and 'OFF' conditions or states by selectively applying bias voltage to the active layer 14. In one state (e.g., the 'ON' state) in which the bias voltage is not applied, the laser light may be transmitted from the section 16 of the waveguide core 12 through the active layer 14 to the section 18 of the waveguide core 12. In another state (e.g., the 'OFF' state) in which the bias voltage is applied to provide an applied stimulus to the active material of the active layer 14, the laser light is refracted laterally at the interface 28 out of the section 16 of the waveguide core 12 and is not transmitted from the section 16 through the active layer 14 to the section 18 of the waveguide core 12. Through the selective application of bias voltage, laser light propagating in the waveguide core 12 is transmitted in the 'ON' state and diverted in the 'OFF' state to provide a modulated optical signal as an output. For example, if the active layer 14 provides a two-state system with different refractive indices in response to the application and removal of the bias voltage, the modulated optical signals may vary between binary "0" and binary "1".

The structure 10 provides an optical power modulator that is substantially more compact than conventional optical power modulators. The structure 10 may also exhibit a high extinction ratio in comparison with conventional optical power modulators. The structure 10 may also be insensitive to minor temperature variations in contrast to conventional optical power modulators. The optical activity of the active layer 14 permits the structure 10 to act as a total light reflector diverting laser light to the environment surrounding the waveguide core 12. The angling of the interface 28 may be effective to aid in suppressing back reflection. In addition to the total internal reflection precipitated by the change in the real part of the refractive index in response to the biasing of the active layer 14, the increase in the imaginary part of the refractive index when the bias voltage is applied may increase the optical loss in the binary "0" state.

Figure 4:
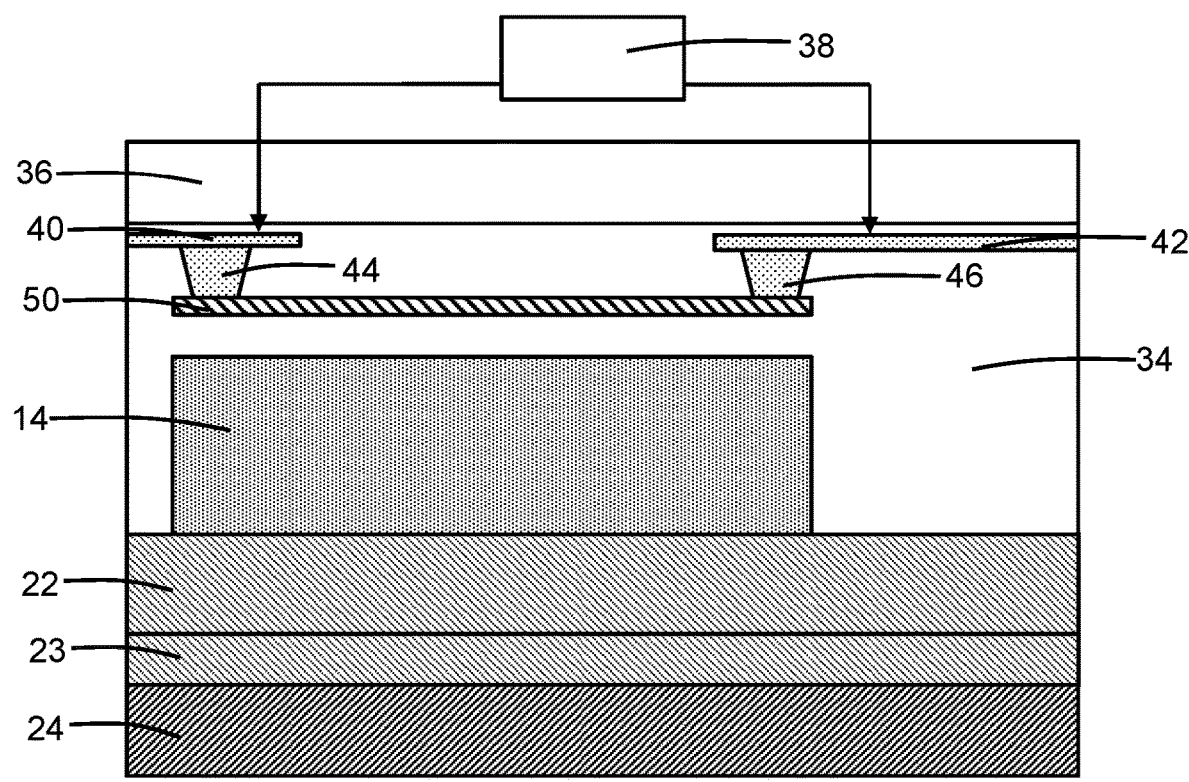
FIG. 4 is a cross-sectional view of a structure in accordance with alternative embodiments of the invention.

With reference to FIG. 4 in which like reference numerals refer to like features in FIG. 3 and in accordance with alternative embodiments of the invention, a thin film resistor 50 may be formed in the dielectric layer 34 adjacent to the active layer 14. In an embodiment, the thin film resistor 50 may be positioned over and above the active layer 14. The thin film resistor 50 may be connected by the contact 44 with the wire 40 and by the contact 46 with the wire 42. The electrode 20 and the lateral extension of the active layer 14 are omitted from the modified structure 10, which does not rely on applying a bias voltage to tune the active material of the active layer 14 between the different refractive indices. The thin film resistor 50 provides a resistance heater that responds to an applied current with Joule heating. The thin film resistor 50 may be comprised of a resistive material, such as nickel-chromium, tantalum nitride, or titanium nitride, that is characterized by a sufficient resistance to provide the desired Joule heating.

The active material of the active layer 14 may be characterized by a temperature-dependent refractive index. Heat from the thin film resistor 50 may be used as an applied stimulus to change the temperature of the active layer 14 and provide the different refractive indices effective for light modulation within the structure 10. In an embodiment, the active layer 14 may be comprised of a phase-change material characterized by an index of refraction that reversibly varies with changes in its temperature among discrete states characterized by significantly different refractive indices. The phase change of the phase-change material to provide the different states may be precipitated by small temperature changes about (i.e., above and below) the transition temperature. In an embodiment, after the temperature is increased above the transition temperature, the phase of the phase-change material may change during cooling to either an amorphous phase or a crystalline phase, which are characterized by different refractive indices, contingent upon the cooling rate. In an embodiment, the amorphous phase of the phase-change material may be formed by fast cooling and may be substantially transparent to laser light, and the crystalline phase of the phase-change material may be formed by slow cooling and may be reflective to laser light. In an embodiment, the active layer 14 may be comprised of vanadium oxide. In an embodiment, the active layer 14 may be comprised of germanium-antimony-tellurium.

The index of refraction of the active layer 14 may be tuned as a function of the temperature of the phase-change material. To that end, a current may be applied to the thin film resistor 50 to produce heat by Joule heating. The heat is transferred by thermal conduction through the dielectric layer 34 to the active layer 14. The heat is absorbed by the active layer 14 and elevates the temperature of the phase-change material. The rate of heat energy transfer (i.e., the heat flux) may be discontinued or reduced to permit the phase-change material to cool. In an embodiment, the heating may raise the temperature of the phase-change material of the active layer 14 above the transition temperature, and different cooling rates may provide the states of different refractive index.

Figure 5:
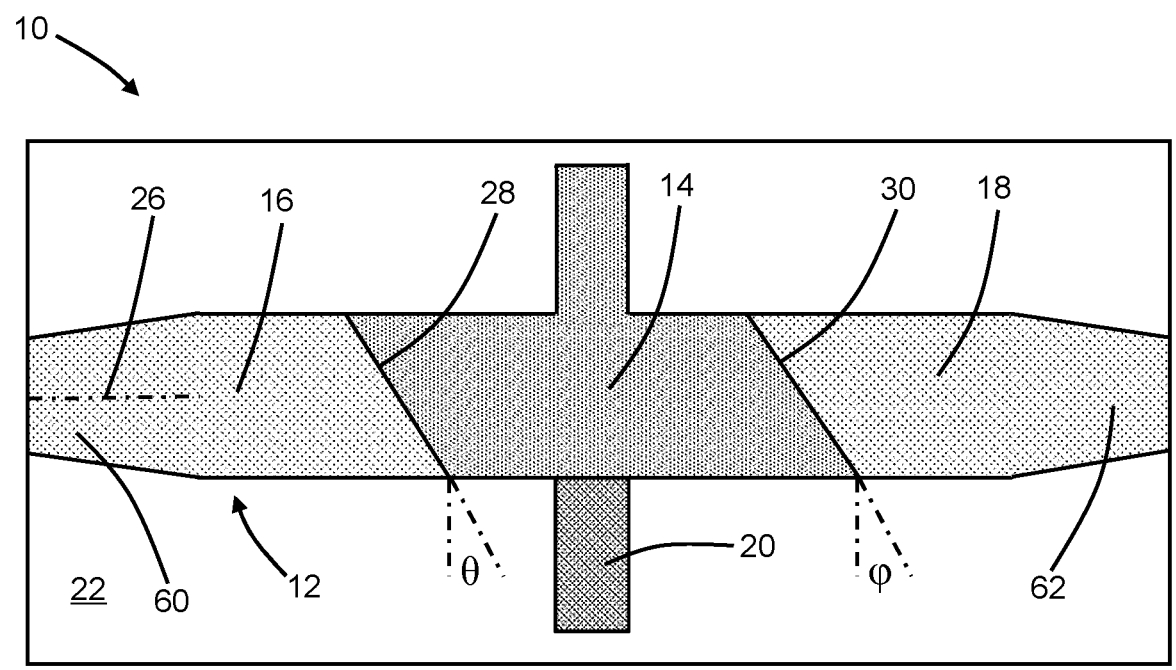
FIG. 5 is a top view of a structure in accordance with alternative embodiments of the invention.

With reference to FIG. 5 in which like reference numerals refer to like features in FIG. 1 and in accordance with alternative embodiments of the invention, tapers 60, 62 may be added to the sections 16, 18 of the waveguide core 12. The tapers 60, 62 may further reduce the insertion loss and further increase the extinction ratio, while further mitigating back reflection.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a dielectric layer;
   a waveguide core on the dielectric layer, the waveguide core including a longitudinal axis, a first section, and a second section spaced from the first section along the longitudinal axis;
   an electrode on the dielectric layer, the electrode including a first portion and a second portion extending laterally from the first portion; and
   an active layer directly on the first portion of the electrode, the active layer including a first portion positioned along the longitudinal axis between the first section and the second section of the waveguide core and a second portion extending laterally from the first portion of the active layer, the active layer comprised of a material configured to have a first state with a first refractive index in response to an applied stimulus and a second state with a second refractive index different from the first refractive index,
   wherein the active layer and the first section of the waveguide core intersect at a first interface, and the first interface is angled at a first acute angle relative to the longitudinal axis.

2. The structure of claim 1 wherein the waveguide core comprises silicon nitride, and the material of the active layer comprises indium-tin oxide, lithium niobite, or barium titanate.

3. A structure comprising:
   a waveguide core including a longitudinal axis, a first section, and a second section spaced from the first section along the longitudinal axis; and
   an active layer including a first portion positioned along the longitudinal axis between the first section and the second section of the waveguide core, the active layer comprised of a material configured to have a first state with a first refractive index in response to an applied stimulus and a second state with a second refractive index different from the first refractive index;
   a dielectric layer over the waveguide core and the active layer;
   a resistance heater positioned in the dielectric layer adjacent to the active layer, the resistance heater configured to generate heat that is transferred through the dielectric layer as the applied stimulus to the material of the active layer
   a first contact coupled to the resistance heater; and
   a second contact coupled to the resistance heater,
   wherein the active layer and the first section of the waveguide core intersect at a first interface, and the first interface is angled at a first acute angle relative to the longitudinal axis.

4. The structure of claim 1 wherein the active layer and the second section of the waveguide core intersect at a second interface.

5. The structure of claim 4 wherein the second interface is angled at a second acute angle relative to the longitudinal axis.

6. The structure of claim 1 wherein the active layer and the first section of the waveguide core intersect are in direct contact at the first interface.

7. The structure of claim 1 wherein the first acute angle of the first interface is less than a critical angle determined by Snell's Law with the active layer in the second state, and the first acute angle of the first interface is greater than the critical angle with the active layer in the first state.

8. The structure of claim 1 wherein the first section of the waveguide core includes a first taper, and the second section of the waveguide core includes a second taper.

9. A method comprising:
   forming a waveguide core on a dielectric layer, wherein the waveguide core includes a longitudinal axis, a first section, and a second section spaced from the first section along the longitudinal axis;
   forming an electrode on the dielectric layer, wherein the electrode includes a first portion and a second portion extending laterally from the first portion; and
   forming an active layer directly on the first portion of the electrode, wherein the active layer includes a first portion positioned along the longitudinal axis between the first section and the second section of the waveguide core and a second portion extending laterally from the first portion of the active layer,
   wherein the active layer and the first section of the waveguide core intersect at a first interface, the first interface is angled at a first acute angle relative to the longitudinal axis, the active layer is comprised of a material configured to have a first state with a first refractive index in response to an applied stimulus and a second state with a second refractive index different from the first refractive index.

10. The method of claim 9 wherein the waveguide core comprises silicon nitride, and the material of the active layer comprises indium-tin oxide.

11. The structure of claim 3 wherein the active layer and the second section of the waveguide core intersect at a second interface.

12. The structure of claim 11 wherein the second interface is angled at a second acute angle relative to the longitudinal axis.

13. The structure of claim 3 wherein the active layer and the first section of the waveguide core intersect are in direct contact at the first interface.

14. The structure of claim 3 wherein the first acute angle of the first interface is less than a critical angle determined by Snell's Law with the active layer in the second state, and the first acute angle of the first interface is greater than the critical angle with the active layer in the first state.

15. The structure of claim 3 wherein the first section of the waveguide core includes a first taper, and the second section of the waveguide core includes a second taper.

16. The structure of claim 3 wherein the waveguide core comprises silicon nitride, and the material of the active layer comprises vanadium oxide or germanium-antimony-tellurium.

17. The structure of claim 1 further comprising:
a first contact coupled to the second portion of the electrode; and
a second contact coupled to the second portion of the active layer.

18. The structure of claim 16 further comprising:
a power supply coupled to the first contact and the second contact, the power supply configured to apply a bias voltage as the applied stimulus to provide the first state and to remove the bias voltage to provide the second state.

19. The structure of claim 5 wherein the second acute angle is equal to the first acute angle.

20. The method of claim 9 wherein the waveguide core comprises silicon nitride, and the material of the active layer comprises lithium niobite or barium titanate.

* * * * *